No. 634,776. Patented Oct. 10, 1899.

R. H. THOMPSON.
NUT LOCK.
(Application filed Feb. 25, 1899.)

(No Model.)

WITNESSES:
Doyn Tuitchell
Rev. G. Hoster

INVENTOR
Richard H. Thompson
BY
ATTORNEYS.

UNITED STATES PATENT OFFICE.

RICHARD HENRY THOMPSON, OF OSCEOLA MILLS, PENNSYLVANIA.

NUT-LOCK.

SPECIFICATION forming part of Letters Patent No. 634,776, dated October 10, 1899.

Application filed February 25, 1899. Serial No. 706,780. (No model.)

*To all whom it may concern:*

Be it known that I, RICHARD HENRY THOMPSON, of Osceola Mills, in the county of Clearfield and State of Pennsylvania, have invented a new and Improved Nut-Lock, of which the following is a full, clear, and exact description.

The object of the invention is to provide a new and improved nut-lock which is simple and durable in construction and arranged to permit a convenient screwing up of the nut and to automatically lock the nut against return movement.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
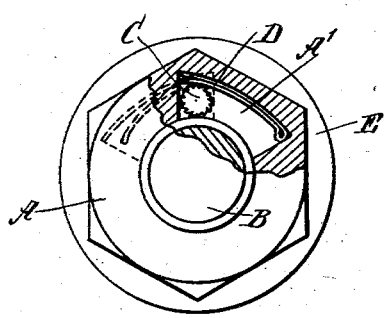
Figure 2:
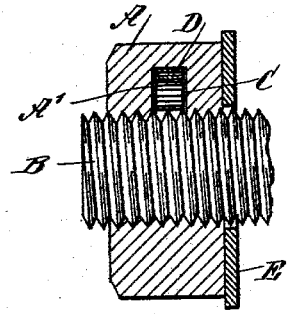
Figure 3:
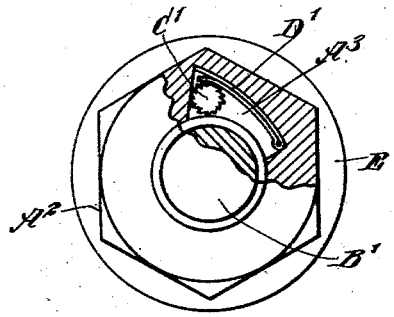
Figure 4:
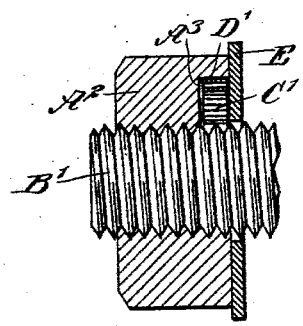

Figure 1 is a sectional face view of the improvement. Fig. 2 is a sectional side elevation of the same. Fig. 3 is a sectional face view of a modified form of the improvement, and Fig. 4 is a sectional side elevation of the same.

The nut A, provided with the nut-lock, screws on the bolt B in the usual manner and is formed with a pocket A', having its opening at the bore of the nut on the screw-threads, the outer wall of said pocket being eccentric to the threads. In the pocket A' is held a roller C, preferably formed with teeth and adapted to ride on the threads of the bolt B. When the nut A is screwed up, a spring D, held in the pocket A', presses against the peripheral surface of the roller to hold the same with the opposite side in contact with the threads of the bolt B. When the nut A is screwed up, it is locked against return movement by the said roller C, as screwing the nut in the reverse direction will bind on the threads of the bolt B, and thus prevent turning of the nut.

As shown in Fig. 1, the pocket A' is narrowest at its middle and large at its ends to permit of passing the roller C from one end of the pocket A' to the other when unscrewing the nut A with force by the use of a very heavy wrench, so that the nut can be unscrewed, if desired, as soon as the roller has passed into the other end of the pocket. Normally, however, the nut is securely locked against return movement by the roller to prevent the nut from jarring or otherwise working loose.

As shown in Fig. 3, the nut $A^2$ has its pocket $A^3$ formed large at one end only, so that the nut cannot be unscrewed even by the use of a heavy wrench, as the roller C' firmly binds and cuts into the threads of the bolt B' upon unscrewing the said nut. The spring D' shown in this construction serves to hold the roller C' in contact with the threads of the bolt B', and the pocket $A^3$ is located at the inner face of the nut adjacent to the washer E instead of at the middle of the nut, as shown in Fig. 2.

When the roller and the spring are removed from the pocket, the nut can be used in the same manner as nuts of ordinary construction. It is understood that the form of pocket A' shown in Fig. 1 can be substituted for that of pocket $A^3$, and vice versa.

Having thus fully described my invention, I claim as new and desire to secure by Letters Patent—

1. A nut-lock, comprising a nut having a pocket formed therein and communicating with the bore of the nut, the outer wall of the pocket extending eccentrically to the bore of the nut and the pocket having one portion larger than the other, a roller mounted in the pocket and adapted to bind between the outer wall thereof and the bolt to lock the nut, and a spring mounted in the pocket and extending along the outer wall thereof, the spring bearing against the outer side of the roller, to throw the same radially toward the bolt.

2. A nut-lock, comprising a nut having a pocket therein, the pocket communicating with the bore of the nut and one wall of the pocket extending eccentrically to said bore, a roller mounted in the pocket, and a spring attached to the nut within the pocket and bearing against the outer side of the roller, to throw the roller inwardly toward the bolt.

3. A nut-lock, comprising a nut having a pocket formed therein, the ends of the pocket being enlarged and the intermediate portion of the pocket being contracted with respect to the ends, and a roller mounted in the pocket and adapted to bear against one wall thereof and against the bolt, the roller fitting loosely in the large end portions of the pocket and binding at the small intermediate portion thereof.

RICHARD HENRY THOMPSON.

Witnesses:
WM. BENIT BOALICH,
WM. HOWARD WILKINSON.